March 24, 1959

C. C. MADDEN 2,878,797

CONTROL DEVICE AND SYSTEM FOR AN INDUCTION
THROTTLE VALVE AND SUPERCHARGER
OF AN AIRCRAFT ENGINE

Filed Aug. 11, 1953

INVENTOR.
CHARLES C. MADDEN
BY
*Herbert L. Davis*

ATTORNEY

FIG. 5

INVENTOR.
CHARLES C. MADDEN
BY Herbert L Davis
ATTORNEY

United States Patent Office 2,878,797
Patented Mar. 24, 1959

2,878,797

CONTROL DEVICE AND SYSTEM FOR AN INDUCTION THROTTLE VALVE AND SUPERCHARGER OF AN AIRCRAFT ENGINE

Charles C. Madden, Fairlawn, N.J., assignor to Bendix Aviation Corporation, Teterboro, N.J., a corporation of Delaware Application August 11, 1953, Serial No. 373,568

6 Claims. (Cl. 123—103)

The present invention relates to improved control devices and systems for the power units of aircraft, particularly of the supercharged internal combustion engine type arranged for driving the propeller of a helicopter or other aircraft.

More particularly, the present invention relates to improvements in control units of the type disclosed and claimed in copending application Serial No. 596,472, filed May 29, 1945, by Howard A. Alexanderson and Robert Z. Hague and in U.S. Patent No. 2,583,537, granted January 29, 1952, to Howard A. Alexanderson and Arthur H. Le Febvre and all assigned to a common assignee, Bendix Aviation Corporation.

An object of the invention is to provide novel means for effecting sequential control of an air intake throttle valve and waste gate for controlling the speed of a variable speed supercharger so as to maintain air intake pressure to the engine at a selected value.

Another object of the invention is to provide novel means for sensing the speed of the supercharger and operating on the waste gate of the supercharger so as to prevent the speed of the supercharger from exceeding a predetermined maximum limit.

Another object object of the invention is to provide novel means for operating a motor control means for positioning an air intake throttle valve within a predetermined range of adjustment and effecting direct manual control of the air intake throttle valve upon failure of the normally operative motor means.

Another object of the invention is to provide a novel anti-hunting means for applying a stabilizing signal to the control unit so as to prevent the regulated induction pressure from overshooting.

The above and other objects and advantages of present invention will appear more fully hereinafter from a consideration of the detailed description which follows, taken together with the accompanying drawings wherein the features of the present invention are illustrated. It is to be expressly understood, however, that the drawings are for the purpose of illustration only and are not designed as a definition of the limits of the invention.

In the drawings wherein like reference characters refer to like parts throughout the several views.

Figure 1:
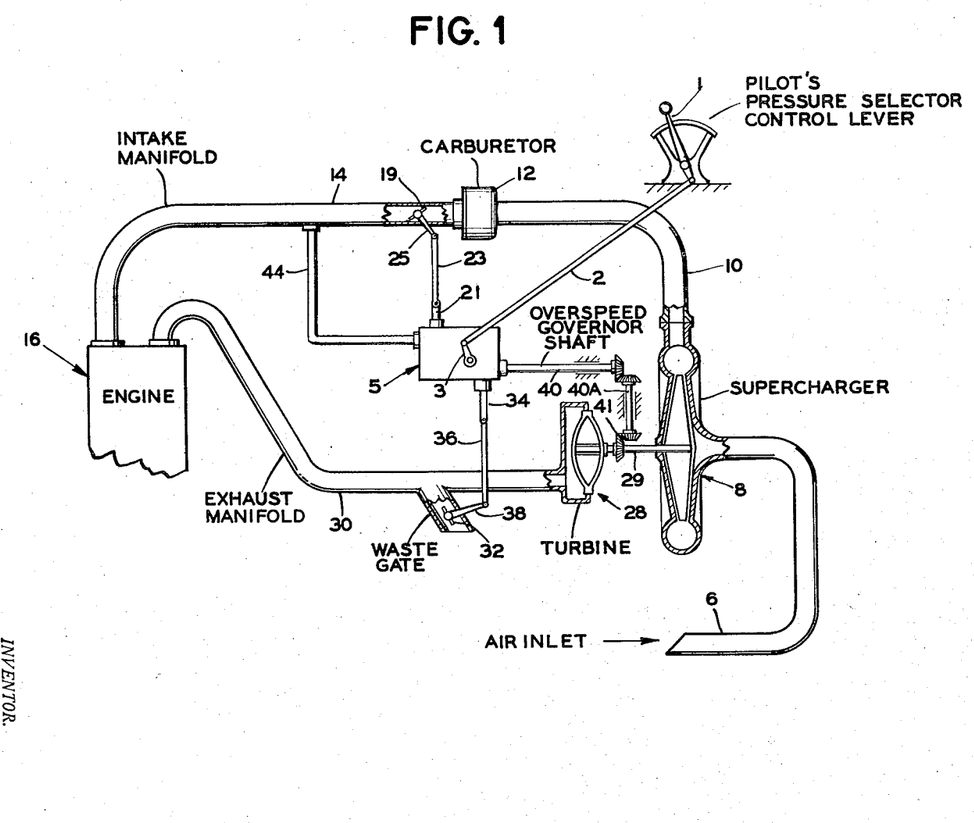
Figure 1 is a diagrammatic view of the control unit operatively connected in a typical engine control system.
Figure 2:
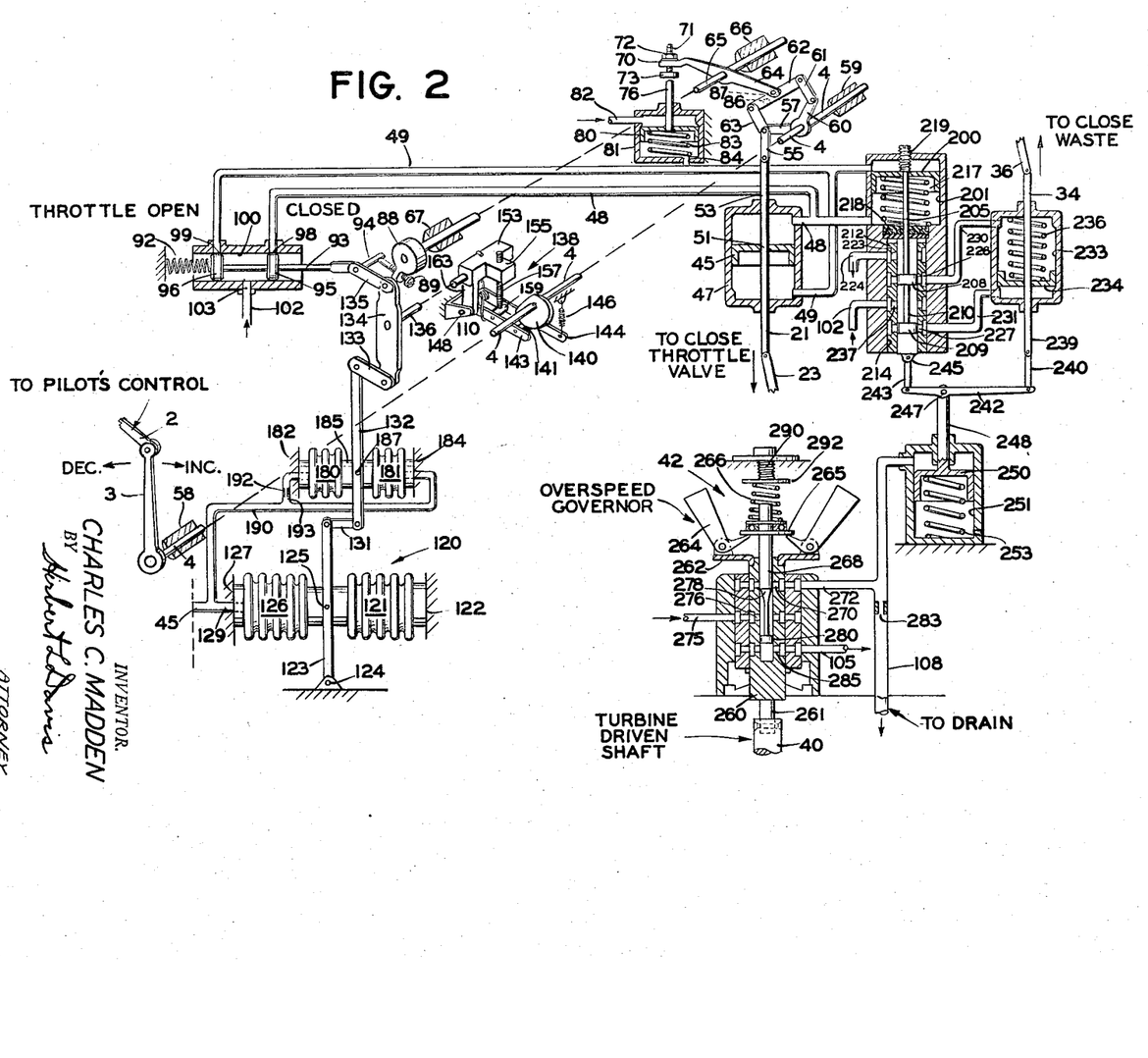
Figure 2 is a diagrammatic view of the mechanism of the main control unit shown in Figure 1.
Figures 3, 4:
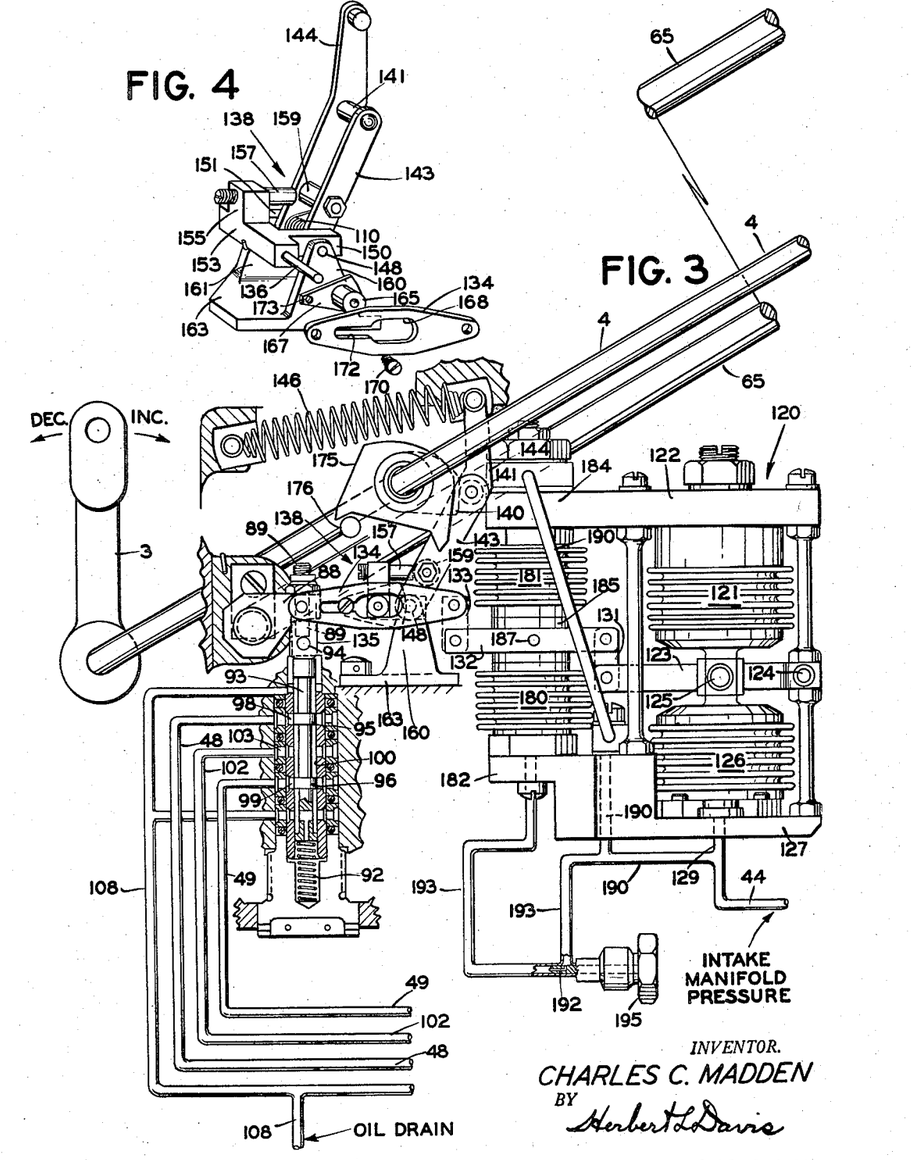
Figure 3 is a fragmentary detail view of the induction pressure setting and sensing mechanism of the main control unit.
Figure 4 is an enlarged exploded view of the cam follower mechanism of Figure 3.

Referring to Figure 1, there is provided in the present invention a main pilot's control lever 1, which is connected by a link 2 to an operative control lever 3. As shown in Figures 2 and 3, the control lever 3 is keyed to a main control shaft 4 which extends into the main control unit indicated in Figure 1 by the numeral 5 and shown diagrammatically in Figure 2.

As shown in Figure 1, a conduit 6 leads from an airscoop into the air inlet for a supercharger 8. A conduit 10 conducts the air from the air outlet of the supercharger 8 through a carburetor 12 and intake manifold conduit 14 to the engine 16. A carburetor throttle valve 19 controls the air intake conduit 14.

The throttle valve 19 is controlled by a piston rod 21 operably connected by link 23, as shown in Figure 1, to a throttle control arm 25. The piston rod 21 is operatively positioned by the control mechanism 5, as hereinafter explained with reference to Figures 2 to 5.

As is shown in Figure 1, the supercharger 8 is driven through shaft 29 by an exhaust gas turbine 28, of a type well known in the art, connected through a conduit 30 with the exhaust manifold of the engine 16 and controlled by a waste gate valve 32. The waste gate valve 32 is controlled by a piston rod 34 operatively connected by a link 36 to a waste gate control arm 38. The piston rod 34 is operatively positioned by the control mechanism of Figures 2 to 6, as hereinafter explained.

There is also provided a shaft 40 and 40A connected at 41 by suitable transmission gearing to the driven shaft 29 of the supercharger 8 so as to drivingly connect the shaft 29 to an overspeed governor control 42 in the control mechanism 5. The mechanism 5 further senses through a conduit 44 the intake manifold pressure in the conduit 14 so as to effect sequential operation of the air intake throttle valve 19 and waste gate control valve 32 so as to maintain the air intake pressure in the conduit 14 at a value set by the adjusted position of the pilot's control lever 1 subject, of course, to the action of the overspeed governor 42 of Figures 2 and 6, as hereinafter explained.

*Throttle valve control*

Figure 5:
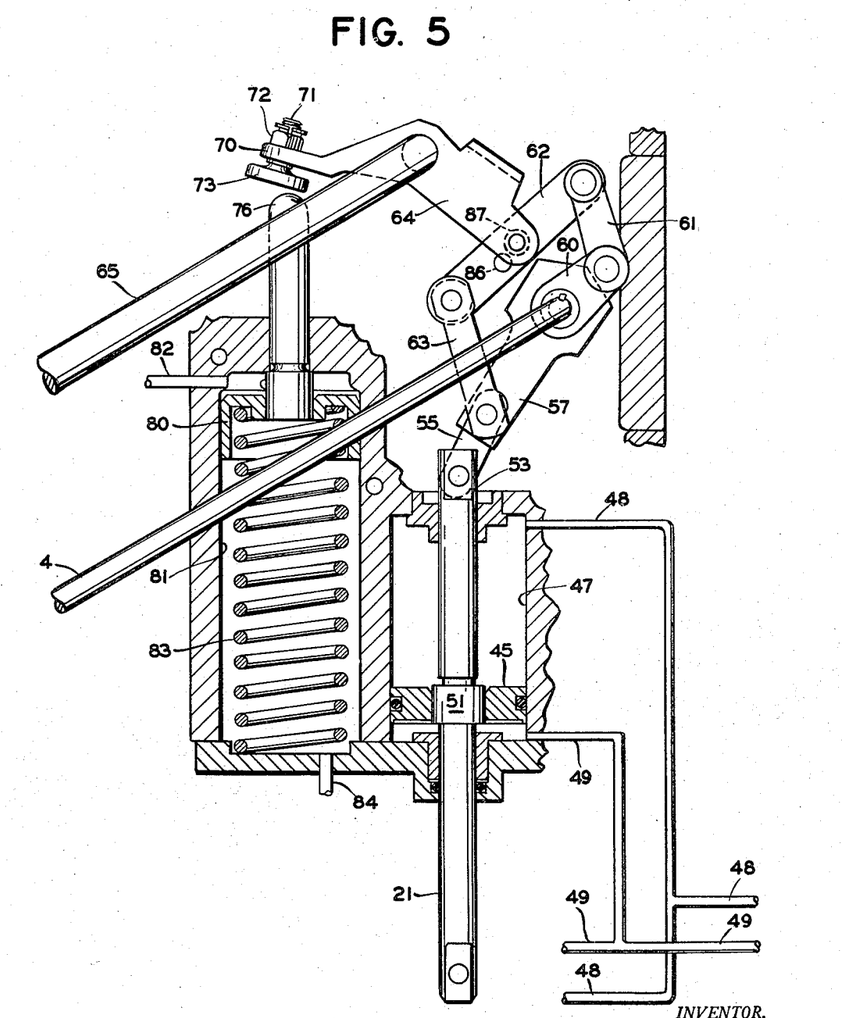
Figure 5 is a fragmentary detail view of the throttle valve control piston and operative linkage of the main control unit.

As shown in Figures 2 and 5, there is provided a servo piston 45 for operating the throttle valve 19 through the piston rod 21. The piston 45 is slidably mounted in a cylinder 47 having fluid pressure inlet passages 48 and 49 opening at opposite sides of the piston 45.

The piston 45 has a piston rod affixed thereto at 51 and extending from opposite ends of the cylinder 47 are portions of the piston rod 21 and 53. The piston rod 53 is pivotally connected by a link 55 to an arm 57 freely rotatable on the pilot's control shaft 4. The shaft 4 is rotatably supported in bearing portions 58 and 59 forming a part of the control unit 5.

Keyed to the pilot's control shaft 4 is a second arm 60 connected through a link 61 to one end of a walking beam 62. The opposite end of the walking beam 62 is connected through a link 63 to the arm 57. The link 61 is pivotally connected at opposite ends to the arm 60 and walking beam 62 while the link 63 is pivotally connected at opposite ends to the arm 57 and the walking beam 62.

Pivotally connected at a point intermediate the opposite ends of the walking beam 62 is one end of a lever arm 64 which is affixed at a point intermediate its opposite ends to a shaft 65.

The shaft 65 is rotatably supported in bearing portions 66 and 67 forming a part of the control unit and shown in Figure 2. The arm 64 pivotally supported by the shaft 65 has a free end 70 in which is adjustably mounted a screw 71 having a lock nut 72 and member 73 arranged for engagement by an end of a stop rod 76 of piston 80. The latter piston 80 is slidably mounted in a cylinder 81 into which opens at one end a passage 82 leading to the servo fluid pressure supply line such as oil under engine pressure. The piston 80 is normally forced under pressure of the oil in a downward direction, as viewed in Figures 2 and 5, while the cylinder 81 at the underside of the piston 80 is vented to drain through a port 84.

A spring 83 is positioned between the piston and the lower end of the cylinder so as to force the piston in an upward direction upon oil pressure failure to the position shown in Figures 2 and 5. The member 73 of the adjustment screw 71 is so arranged as to be engaged by the piston rod 76 and actuated in the latter event to an extreme upward position. In such positions of the piston rod 76 movement of the arm 64 in a counter-clockwise direction is restrained by the piston rod 76, while a stop pin 86 which projects from a portion of the casing of the unit serves, as shown in Figure 5, to engage a member 87 carried by the arm 64 so as to limit movement of arm 64 in an opposite or clockwise direction.

The pilot's control lever 1 may then effect manual control of the throttle valve 19 through shaft 4, arm 60, link 61, walking beam 62, link 63, arm 57, link 55, piston rod portions 53 and 21, link 23 and throttle valve arm 25.

The adjustable screw 71 is preferably adjusted so as to permit a small amount of angular travel of lever 64 between piston stop rod 76 and the stop pin 86. During such manual operation of the throttle 19, lever arm 64 is driven between its restraining stops 76 and 86 rotating shaft 65 as hereinafter explained.

At the opposite end of the shaft 65 there is affixed an arm 88 through which projects an adjustable screw 89. The screw 89 is arranged to engage one end of a valve stem 93. As shown in detail in Figure 3, the screw 89 of the actuating arm 88 engages a pin 94 at the upper end of the valve stem 93. The valve stem 93, as shown in Figure 3, is biased in an upward direction by a spring 92 and has valve members 95 and 96 arranged so as to control ports 98 and 99, respectively, opening into valve chamber 100 and leading through conduits 48 and 49, respectively, to cylinder 47 at opposite sides of piston 45 so as to control the movement of the piston 45. A fluid pressure line 102 opens through a port 103 intermediate the openings of ports 98 and 99 to valve chamber 100. As shown in Figure 3, a fluid medium outlet or drain passage 108 also opens from the valve chamber 100 at the upper and lower sides of valves 95 and 96, respectively.

Thus upon failure of the servo fluid pressure supply which is applied through conduit 82, the piston 80 under force of the spring 83 moves the stop 76 to the position shown in Figures 2 and 5. During such fluid pressure failure, movement of the pilot's control lever 1 so as to move arm 60 in a counter-clockwise direction causes link 61 to pivot walking beam 62 in a counter clockwise direction about the pivoted connection to link 63 to impart movement in a counter-clockwise direction to the lever arm 64 between its restraining stops 86 and 76 so as to cause arm 88 and stop screw 89 to move away from valve stem 93, whereupon the valve stem 93 under force of a spring 110 on the cam follower mechanism of Figure 4, as hereinafter explained, thereupon follows the arm 88 and stop screw 89 so as to cause servo valves 95 and 96 to move from the neutral position, as shown in Figures 2 and 3 to a position in which valve 95 uncovers the port 98 to the pressure port 103 and the valve 96 uncovers the port 99 to drain. Upon such movement of arm 64 being arrested by stop rod 76 further counter-clockwise pivotal movement of lever 62 about the pivotal connection to arm 64 will effect adjustment of the throttle valve 19 manually in a closing direction through linkage 63, 55, 53, piston 45 and link 21. The opening of the conduit 49 to drain through the port 99 by the adjustment of valve 96 prevents a fluid lock of the piston 45.

Similarly, upon movement of the lever arm 64 in a clockwise direction between its restraining stops 76 and 86 as upon manual movement of arm 60 in a clockwise direction, lever arm 88 actuates through the screw 89 the valve stem 93 in a direction so as to cause valve 96 to open the port 99 to the pressure conduit 103 and the valve 95 to open the port 98 to drain. Upon such movement of the arm 64 being arrested by stop 86, further clockwise pivotal movement of lever 62 about the pivotal connection to arm 64 will effect adjustment of the throttle valve 19 manually in an opening direction through link 63, 55, 53, piston 45 and link 21. It will be seen that the manual operation of servo valve 93 not only effects the opening of the ports 98 and 99 so as to prevent a fluid lock of the piston 45, but also directs any servo fluid pressure so as to augment the manual operation of the piston 45 and throttle valve 19. Thus in the event slight servo fluid pressure be available, such movement of the servo valve 93 directs such slight fluid pressure to so affect piston 45 as to assist the manual movement of the piston 45 and thereby assist in the manual control of throttle valve 19.

*Automatic control of throttle*

When fluid pressure is available in excess of a predetermined value, the piston 80 is moved downward under the pressure medium from passage 82 against the force of spring 83. This latter action forces the stop 76 downward so as to permit lever arm 64 to move free of the stop 76 and upon manual adjustment of the walking beam 62 in a counterclockwise direction, the arm 64 follows in a counterclockwise adjustment releasing the valve stem 93 and in turn permitting the valve stem 93 to be adjusted freely under automatic control, as hereinafter explained.

In order to effect the latter automatic control there is provided a pressure responsive bellows assembly, shown in Figures 2 and 3, and indicated generally by the numeral 120 and including an evacuated bellows 121 supported at one end by a base member 122.

A suitable spring, not shown, may be positioned within the evacuated bellows 121 tending to expand the same. At the some opposite end of the bellows 121 there is provided a movable plate or arm 123 pivotally mounted at 124 and pivotally connected at 125 between the bellows 121 and a second bellows 126. The bellows 126 is supported at the opposite end by a second base member 127.

A passage 129 formed in the control unit leads from the interior of the bellows 126 to the conduit 44 which, as shown in Figure 1, leads to the air intake manifold conduit 14. Thus the bellows 126 is controlled by the intake manifold pressure of the engine 16.

The movable plate 123 between the manifold pressure bellows 126 and evacuated bellows 121 is connected through a link 131, arm 132, link 133, beam 134 and a link 135 to the servo valve 93.

The selected pressure or datum of the bellows assembly may be changed by moving a pin 136 on which beam 134 is pivotally supported. Pin 136 is adjusted through operation of a cam follower mechanism indicated generally by the numeral 138, in Figures 2 and 3, and shown in detail in Figure 4.

It will be readily seen, however, from the foregoing that upon an increase in the intake manifold pressure above the selected pressure, there will result an expansion of the manifold pressure bellows 126 causing the beam 134 to be shifted in a clockwise direction whereupon the servo valve 93 will be adjusted so as to cause a pressure medium to be applied through the passage 48 to the upper side of the piston 45 of Figures 2 and 5 and exhausting the lower side through passage 49 to drain. This action will cause the piston 45 to be adjusted downward moving the throttle valve 19 of the Figure 1 in a valve closing direction decreasing the intake manifold pressure until the valve 93 is returned to a neutral position. An opposite effect is, of course, produced upon the intake manifold pressure dropping below the selected valve.

Pressure selecting mechanism

A pressure selector cam 140 is rigidly keyed to the pilot's control shaft 4, as shown in Figures 2 and 3. Contacting the contour of the selected cam 140 is a cam follower 141 mounted between follower levers 143 and 144. The follower levers are loaded by an extension spring 146 and, as best shown in Figure 4, are pivotally mounted by a pin 148 between bifurcated arms 150 and 151 of a selector member 153. Extending at right angles to the arms 150 and 151 is a third arm 155 through which projects an adjustable stop pin 157 which is arranged to releasably engage a pin 159 mounted between the follower arms 143 and 144. The spring 110, best shown in Figure 4, biases the arms 143—144 and member 153 one toward the other so that the stop pin 157 normally engages the pin 159 under the biasing force of the spring 110, and the member 153 in turn normally follows the adjustment of the arms 143—144 by the cam 140.

The selector member 153 is pivoted on the pin 148 which is in turn pivotally supported between bifurcated arms 160 and 161 on a fixedly mounted supporting member 163. As shown in Figures 3 and 4, the pin 136 projects from the selector member 153 into a bushing 165 mounted on an adjustable plate 167. The bushing 165 is adjustably positioned in a slot 168 in the beam 134 and affixed therein by a lock screw 170 which projects through an extension 172 of the slot 168 and screw threadedly engages in the plate 167 at 173. It will be seen then that the pin 136 pivotally supports the beam 134 and that adjustment thereof through operation of the cam follower mechanism 138 will effect a corresponding adjustment of the selected pressure or datum of the bellows assembly.

Thus with the spring 146 biasing lever arms 143 and 144 about pin 148 in a counter-clockwise direction so as to cause follower 141 to be held in contacting relation with the cam 140, and the stop pin 157 and pin 159 being held together under the biasing force of spring 110, the follower 141 and selector member 153 act as a unit, and the pressure selected through adjustment of the cam 140 is transmitted to the bellows and valve linkage through pin 136.

The surface of the cam 140 is so shaped that as the lever 3 is manually adjusted in a clockwise direction, the cam 140 cooperates with the follower mechanism 138 so as to increase the pressure setting while adjustment of lever 3 in a counter-clockwise direction decreases the pressure setting. As shown in Figure 3, a plate 175 affixed to the shaft 4 is arranged to cooperate with a stop pin 176 affixed to a portion of the casing of the control, not shown, so as to limit the adjustment of the cam between suitable maximum and minimum limits.

Anti-hunting device

The bellows assembly 120 includes the intake manifold pressure responsive bellows 126 and the opposed evacuated bellows 121 having a like-effective exterior surface area to counter balance the bellows 121 for changes in atmospheric pressure acting on the exterior thereof, together with an anti-hunting device including bellows 180 and 181. The bellows 180 and 181 have equal effective areas and are arranged in opposed relation. The bellows 180 is supported at one end by a base member 182 while the opposite end is movable. The bellows 181 is also supported at one end by a base member 184 while the other end is movably connected by a member 185 to the movable end of the bellows 181. The member 185 is in turn pivotally connected by a pin 187 to the beam 132 and thereby operatively connects the movable ends of the bellows 180 and 181 to the beam 132.

The interior of both bellows 180 and 181 are connected through a conduit 190 to the intake manifold pressure applied through conduit 44, but the intake manifold pressure signal applied to the interior of bellows 180 is delayed by a restriction 192 in a conduit 193 leading from the conduit 190 to the interior of the bellows 180 while the conduit 190 leading to the interior of bellows 181 is unrestricted.

Thus, upon a change in the intake manifold pressure, the delay in the signal applied to the bellows 180 due to the restriction 192 will temporarily unbalance the bellows 180 and 181 and tend initially to add to the signal of the intake manifold pressure responsive bellows 126 and thereafter apply a stabilizing signal through the linkage 132, 133, 134 and 135 to the control valve 93 as the pressures in the bellows 180 and 181 tend to balance serving in effect to wipe out the initial signal and counter balance the action of the bellows 181 which is more rapidly responsive to change in the intake manifold pressure.

Thus the action of the bellows 180 and 181 is to temporarily satisfy the control at a setting other than that being selected so as to cause the pilot valve 93 to assume a neutral position sooner than it would if the bellows 180 and 181 were not incorporated. Moreover, as the pressure equalizes in the two bellows 180 and 181, the pilot valve 93 will be slowly displaced and then be corrected by the action of both bellows 180 and 181 and bellows 121 and 126 so that a minimum, or no overshoot in the controlled intake manifold pressure is encountered. As shown in Figure 3, a nut 195 carries the restriction member 192 which may be changed by replacement of the nut 195 with another nut 195 carrying a restriction 192 of a different predetermined value, so that the effect of the stabilizing signal can be changed as required for different installations.

Supercharger speed control

As the valve 93 is adjusted by the bellows assembly 120 from its neutral position, there is effected a corresponding adjustment of the piston 45 and as the bellows assembly calls for greater pressure, the piston 45 is adjusted upward and the rod 21 inward, as viewed in Figures 1, 2 and 3, until the throttle valve 19 has been adjusted to the fully open position.

When the piston 45 has opened the throttle 19 fully, if the manifold pressure still remains less than the setting, the fluid pressure differential across passages 48 and 49 will rise above a predetermined pressure value to effect operation of a piston 200.

Figure 6:
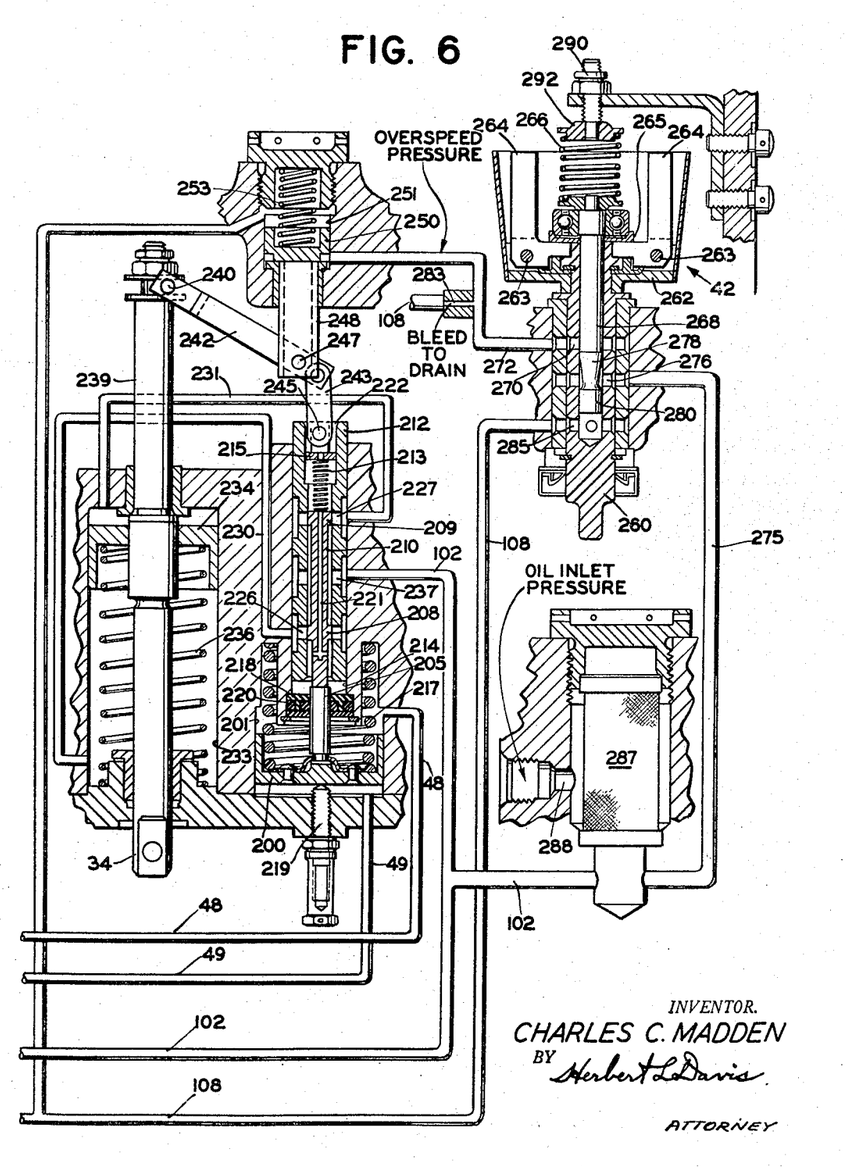
Figure 6 is a fragmentary detail view of the waste gate control mechanism and overspeed governor of the main control unit.

The piston 200 is slidably mounted in a piston chamber 201 into one end of which the conduit 48 opens, while the conduit 49 opens into the opposite end of the chamber 201 so that the differential pressure applied to the throttle valve control piston 45 may also be applied to the piston 200. The piston 200 operates through a rod 205, valve members 208 and 209 and valve stem 210 connecting the same. The valve members 208 and 209 are slidably mounted in a valve sleeve 212 which is adjustably positioned in a bore 214, as hereinafter explained.

A spring 217 biases the piston 200 in opposition to the force of the fluid medium applied through conduit 49 and the movement of the piston underforce of the spring 217 is limited by an adjustable stop screw 219. A light spring 213 supported at one end by a member 215 mounted in the valve sleeve 212 acts against the free end of the valve stem 210, as shown in Figure 6, to keep valve rod 205 in contact with piston 200 so as to assure that the valve 210 follows the piston 200 without lost motion.

As also shown in detail in Figure 6, a suitable seal 218 is mounted in a recessed portion 220 of the bore 214 and engages in sealing relation the actuating rod 205 so as to prevent leakage of fluid medium from the piston chamber 201 into the bore 214 and valve sleeve 212. A passage 221 in the valve stem 210 serves to conduct servo fluid from the interior of the sleeve valve 212 out the open end 222 to drain. In the schematic drawing of Figure 2, a port 223 in the valve sleeve 212 is shown schematically as connecting the sealed end of the valve sleeve 212 to drain through a conduit 224. However in actual practice the drain conduit 221 is preferably formed in this valve stem 210, as shown, so as to connect the sealed end of the valve sleeve 212 to drain through the open end 222.

The valve members 208 and 209 control ports 226 and 227, respectively, in the valve sleeve 212. Conduits 230, 231 lead from the ports 226 and 227, respectively, to opposite ends of a piston chamber 233 in which is slidably mounted a piston 234 biased by spring 236 in a direction in opposition to the fluid pressure medium applied through conduit 231. The fluid pressure supplied through conduit 102 opens into a port 237 formed in the valve sleeve 212 and opening into the interior of the valve sleeve 212 at a point intermediate of valve members 208 and 209.

Operatively connected to the piston 234 is a piston rod which projects through the opposite ends of the piston chamber 233. One portion of the piston rod 34 is connected by link 36 and arm 38 to the waste gate control valve 32 as shown in Figure 1. The opposite end portion 239 of the piston rod is operatively connected at 240 to beam 242 and through link 243 to the valve sleeve 212 by a pin 245. The beam 242 is pivotly connected by pin 247 to a piston rod 248 connected to an overspeed control piston 250 slidably mounted in a piston chamber 251 and biased by a spring 253 to the position, as shown, under normal speed conditions of the supercharger 8, as hereinafter explained.

It will be seen from the foregoing that when the operating conditions are such that the throttle piston 45 has adjusted the throttle valve 19 to its wide open position and the bellows assembly 120 is not satisfied with the intake manifold pressure obtained, the pressure differential across the piston 45, which is also across the waste gate control piston 200 becomes sufficiently high as to cause the waste gate control piston to be adjusted in opposition to the spring 217 and move away from its stop 219. Such action of the piston 200 will cause the valve members 208 and 209 to be adjusted so as to open fluid conduit 231 to the fluid medium applied through conduit 102 and to open the conduit 230 to drain causing the waste gate control piston 234 to move the rod 34 outward and effecting, as shown in Figure 1, a closing of the waste gate control valve 32. As the rod 34 is moved outward by adjustment of the piston 234, this motion will also be transmitted through the operative mechanism 239, 240, 242, and 243 to the movable sleeve valve 212 causing in turn a follow-up motion to the sleeve valve 212, which will cause the valve member 209 to close port 227 and passage 231 to the pressure medium and the valve member 208 to close the port 226 leading from the conduit 230. Thus, as the pressure differentials are increased or decreased across the waste gate control piston 200, the waste gate piston 234 will follow the same proportionately.

*Supercharger overspeed governor*

In the event the speed of the turbine 28, shown in Figure 1, should exceed a predetermined value, there is provided an overspeed governor indicated by numeral 42 in Figure 2 and shown in detail in Figure 6 and which affects operation of the piston 250 so as to cause movement of the same in a direction in opposition to the spring 253, causing in turn movement of the valve sleeve 212 which will cause adjustment of the waste gate piston 234 in a direction for opening the waste gate 32 so as to decrease or maintain the speed of the turbine to within the predetermined operating range.

The overspeed governor 42 includes a rotatable valve sleeve 260 drivingly connected at one end 261 through the shafts 40 and 40A to the driven shaft 29 of the turbine 28, as shown in Figure 1. The opposite end of the valve sleeve 260 has affixed thereto a plate 262 on which are pivotally mounted by pins 263 suitable weighted members 264 of conventional type operatively connected to a plate 265 biased by a spring 266 in opposition to outward movement of the weights 264 under centrifugal force. The plate 265 is also operatively connected to a valve member 268 which controls the application of a fluid pressure medium through a port 270 in the valve sleeve 260 and conduit 272 to the piston 250.

A fluid supply conduit 275 leads to a port 276 in the valve sleeve 260 opening at a point intermediate valve elements 278 and 280 of the valve 268. A bleed or restriction 283 opens from conduit 272 to drain conduit 108. Another port 285 opens from the sleeve valve 260 to the conduit 108 for conducting leakage fluid from the valve sleeve 260 to drain. As shown in Figure 6, the supply conduits 102 and 275 are connected through a filter 287 to a main fluid pressure inlet connection 288 which may lead from a main source of servo oil fluid under pressure from the engine.

The tension of the spring 266 may be suitably adjusted by an adjustment screw 290 to vary the position of a plate 292 supporting the free end of the spring 266 so as to set the speed setting of the overspeed governor 42 to the speed value desired. It will be seen then that upon the speed of the turbine 28 exceeding the set value of the governor 42, the weights 264 under centrifugal force will pivot outwardly adjusting the valve member 268 so as to increase the supply of servo fluid medium applied through conduit 272 to piston 250 and as the pressure applied to the spring loaded piston 250 builds up, the piston 250 will be adjusted in opposition to the spring 253 causing the valve sleeve 212 to be positioned so as to cause the piston 234 and waste gate 32 operated thereby to be adjusted in a direction to decrease the speed of the supercharger 28 and hold the speed of the turbine 28 to within the prescribed r.p.m. range.

In the event of an oil failure, the waste gate valve 32 will be held in an open position by the action of the spring 236 and the piston 234, and the pilot will be able to manually position the throttle valve 19 in accordance with the schedule built into the linkage 60, 61, 62, 64, 63, 57, 55, 53.

During normal operation, however, the throttle valve 19 will be adjusted automatically by the mechanisms heretofore described until it reaches a wide open position and thereafter additional intake manifold pressure required to meet the setting of the control will be effected through adjustment of the waste gate control valve 210 to cause adjustment of the waste gate 32 so as to increase the speed of the supercharger to meet the intake manifold pressure which may be selected.

Moreover, overspeeding of the supercharger beyond a predetermined safe value will be prevented by the opertion of overspeed governor 42. Thus, the subject control maintains a selected manifold pressure by positioning in sequence the carburetor throttle valve, and waste gate control valve 32.

As the altitude or the selected manifold pressure is increased the control positions the carburetor throttle valve to the wide open position and then positions the exhaust waste gate 32 so that the turbine 28 is driven at sufficient speed to cause the supercharger 8 to satisfy the selected manifold pressure.

In order to keep within a safe r.p.m., the speed of the turbine is measured by the governor 42 and when the predetermined top r.p.m. is reached, the waste gate valve 32 will be automatically repositioned by the overspeed governor 42 so that the speed will remain within the safe limits. Changes in the altitude are automatically compensated so that a selected manifold pressure will be maintained. Moreover, through the arrangement of the anti-hunting device bellows 180 and 181, a stabilizing signal is applied through the operating linkage for the control valve 93 to either the throttle control piston 45 or the waste gate piston 234 depending, of course, upon which is controlling the pressure at the time.

Several embodiments of the invention have been illustrated and described and it is to be expressly understood that various changes may be made in the form and relative arrangements of the parts may be made to suit requirements.

What is claimed is:

1. For use in controlling an engine having an induction throttle valve, a variable speed supercharger, and means for controlling the driven speed of said supercharger; the combination comprising a first piston, a second piston, hydraulic pressure chambers for each of said pistons, induction pressure responsive means, a servo valve operated by said pressure responsive means for controlling the hydraulic pressure applied to both said chambers, said first piston arranged to be actuated in a first sense at a first hydraulic pressure, said second piston arranged to be actuated in a second sense at a greater hydraulic pressure upon said first piston being actuated in said first sense to adjust the induction throttle valve for said engine, means adjustably positioned by the second piston to operate the means for controlling the driven speed of the supercharger, means for changing the datum of the pressure responsive means, and an induction pressure responsive device operatively connected to said datum changing means, said device including a first element responsive to change in the induction pressure for varying the datum in inverse relation to the change in induction pressure, a second element responsive to the change in the induction pressure for counteracting the effect of the first element on the datum changing means, and means for retarding the response of the second element to the change in the induction pressure.

2. For use in controlling an engine having an induction throttle valve, a variable speed supercharger, and means for controlling the driven speed of said supercharger; the combination comprising a first piston, a second piston, hydraulic pressure chambers for said pistons, induction pressure responsive means, a servo valve operated by said pressure responsive means for controlling the hydraulic pressure applied to both said chambers, said first piston arranged to be actuated in a first sense at a first hydraulic pressure, said second piston arranged to be actauted in a second sense at a greater hydraulic pressure upon said first piston being actuated in said first sense to adjust the induction throttle valve for said engine, other means adjustably positioned by the second piston to operate the means for controlling the driven speed of the engine supercharger, means for changing the datum of the pressure responsive means, anti-hunting means cooperating with the pressure responsive means to prevent hunting, said anti-hunting means including a first element to increase the effect of the induction pressure responsive means upon a change in the induction pressure and a second element slowly responsive to such change in the induction pressure to counter balance the first element.

3. Control apparatus for an internal combustion engine having a throttle valve for controlling the flow of combustion air to the intake of said engine, a variable speed supercharger for supplying air under pressure to the intake of said engine, and means for controlling the speed of operation of said supercharger; said control apparatus comprising a first hydraulic servomotor for operating said throttle valve, including a cylinder and a piston reciprocable therein, first servo fluid control means for selectively supplying fluid at high pressure to either end of said cylinder and connecting the opposite end of said cylinder to a source of lower pressure to cause translation of said piston selectively in opposite directions, a second hydraulic servomotor for operating said speed control means including a cylinder and a piston reciprocable therein and operatively connected to said speed control means, a spring means biasing said piston in a direction to adjust said speed control means in a speed decreasing sense, second servo fluid control means for selectively supplying fluid under pressure to either end of said cylinder to bias said piston so as to adjust said speed control means, engine intake pressure responsive means operatively connected to the first servo fluid control means to adjustably position the same so as to maintain the intake pressure at a predetermined value, other servomotor means controlled by said first servo fluid control means, said other servomotor means for adjustably positioning said second servo fluid control means after said throttle valve has been adjusted by said first servomotor to its wide open position so as to cause said second servomotor to vary the speed of the supercharger to maintain the intake pressure at the predetermined value, an anti-hunting device including a first expansible chamber having a movable wall operatively connected to the first servo fluid control means, means connecting said chamber to the engine intake pressure, the wall of said first chamber being movable in response to change in the engine intake pressure so as to momentarily act with the intake pressure responsive means to cause adjustment of the first servo fluid control means in a sense to effect a correction of such change in intake pressure, a second expansible chamber having a movable wall operatively connected to the first servo fluid control means in opposition to the movable wall of the first chamber means connecting the second expansible chamber to the engine intake pressure, said last-mentioned means including a fluid restriction to retard the effect of change in the engine induction pressure on the second expansible chamber, the wall of said second expansible chamber being movable in response to the change in the engine intake pressure in a retarded manner so as to reset the first servo fluid control means and counteract the momentary effect of the first chamber, and a supercharger speed responsive device operatively connected to the second servo fluid control means to adjustably position said second servo fluid control means so as to vary the speed of the supercharger to maintain the speed of the supercharger within a predetermined range.

4. Control apparatus for an internal combustion engine having a throttle valve for controlling the flow of combustion air to the intake of said engine, a variable speed supercharger for supplying air under pressure to the intake of said engine, and means for controlling the speed of operation of said supercharger; said control apparatus comprising a first hydraulic servomotor for operating said throttle valve, including a cylinder and a piston reciprocable therein, first servo fluid control means for selectively supplying fluid at high pressure to either end of said cylinder and connecting the opposite end of said cylinder to a source of lower pressure to cause translation of said piston selectively in opposite directions, a second hydraulic servomotor for operating said speed control means including a cylinder and a piston reciprocable therein and operatively connected to said speed control means, second servo fluid control means for selectively supplying fluid under pressure to either end of said cylinder of said second servomotor to bias said piston of the second hydraulic servomotor so as to adjust said speed control means, said second servo fluid control means including a pair of control elements cooperating one with the other, one of said control elements being adjustably positioned by the piston of said second hydraulic servomotor, engine intake pressure responsive means operatively connected to the first servo fluid control means to adjustably position the same so as to maintain the intake pressure at a predetermined value, other servomotor means controlled by said first servo fluid control means, said other servomotor means for adjustably positioning the other of the control elements of said second servo fluid control means, spring means biasing said other control element in a supercharger speed decreasing sense so as to permit operation of said second hydraulic servomotor in a supercharger speed increasing sense only after said throttle valve has been adjusted by said first servomotor to its wide open position and operation thereafter of said second servomotor to vary the speed of the supercharger to maintain the intake pressure at the predetermined value.

5. The control apparatus defined by claim 4 including a supercharger speed responsive device operatively connected to the one control element of the second servo fluid control means so as to maintain the speed of the supercharger within a predetermined range.

6. The control apparatus defined by claim 4 in which there is provided an anti-hunting device including a first expansible chamber having a movable wall operatively connected to the first servo fluid control means, means connecting said chamber to the engine intake pressure, the wall of said first chamber being movable in response to change in the engine intake pressure so as to momentarily act with the intake pressure responsive means to cause adjustment of the first servo fluid control means in a sense to effect a correction of such change in intake pressure, a second expansible chamber having a movable wall operatively connected to the first servo fluid control means in opposition to the movable wall of the first chamber, means connecting the second expansible chamber to the engine intake pressure, said last-mentioned means including a fluid restriction to retard the effect of change in the engine induction pressure on the second expansible chamber, the wall of said second expansible chamber being movable in response to the change in the engine intake pressure in a retarded manner so as to reset the first servo fluid control means and counteract the momentary effect of the first chamber.

References Cited in the file of this patent
UNITED STATES PATENTS

| | | |
|---|---|---|
| 2,374,708 | Shoults | May 1, 1945 |
| 2,376,199 | Shoults | May 15, 1945 |
| 2,400,126 | Matthews | May 14, 1946 |
| 2,409,871 | Krogh | Oct. 22, 1946 |
| 2,562,742 | Rowe et al. | July 31, 1951 |
| 2,635,581 | Karig | Apr. 21, 1953 |
| 2,725,046 | Wilder | Nov. 29, 1955 |